United States Patent
Donaldson

(10) Patent No.: US 9,306,872 B2
(45) Date of Patent: Apr. 5, 2016

(54) BLUETOOTH VIRTUALISATION

(71) Applicant: Thomas Alan Donaldson, Nailsworth (GB)

(72) Inventor: Thomas Alan Donaldson, Nailsworth (GB)

(73) Assignee: AliphCom, San Francisco, CA (US)

( * ) Notice: Subject to any disclaimer, the term of this patent is extended or adjusted under 35 U.S.C. 154(b) by 4 days.

(21) Appl. No.: 14/188,602

(22) Filed: Feb. 24, 2014

(65) Prior Publication Data

US 2014/0269508 A1  Sep. 18, 2014

Related U.S. Application Data

(60) Provisional application No. 61/798,329, filed on Mar. 15, 2013.

(51) Int. Cl.
 *H04L 12/931* (2013.01)
 *H04W 4/00* (2009.01)

(52) U.S. Cl.
 CPC .............. *H04L 49/20* (2013.01); *H04W 4/008* (2013.01)

(58) Field of Classification Search
 None
 See application file for complete search history.

(56) References Cited

U.S. PATENT DOCUMENTS

| | | | |
|---|---|---|---|
| 7,043,205 B1 * | 5/2006 | Caddes et al. | 455/41.2 |
| 8,798,541 B1 * | 8/2014 | Scott | 455/41.2 |
| 2002/0080754 A1 | 6/2002 | Travostino et al. | |
| 2002/0085719 A1 | 7/2002 | Crosbie | |
| 2002/0131388 A1 * | 9/2002 | Ami et al. | 370/338 |
| 2006/0025076 A1 * | 2/2006 | Yu | 455/41.2 |
| 2007/0049196 A1 | 3/2007 | Hillyard et al. | |
| 2008/0081667 A1 * | 4/2008 | Parikh et al. | 455/558 |
| 2008/0175379 A1 * | 7/2008 | Hansen et al. | 380/44 |
| 2010/0015920 A1 * | 1/2010 | Kim | 455/41.2 |
| 2013/0344809 A1 * | 12/2013 | Aliyath et al. | 455/41.2 |

FOREIGN PATENT DOCUMENTS

WO  2014145135  9/2014

OTHER PUBLICATIONS

Young, Lee W, Notification of Transmittal of the International Search Report and the Written Opinion of the International Searching Authority, or the Declaration, International Searching Authority, for International Patent Application No. PCT/US2014/029844, mailed Nov. 7, 2014.

* cited by examiner

*Primary Examiner* — Brian Roberts
(74) *Attorney, Agent, or Firm* — Kokka & Backus, PC

(57) ABSTRACT

Embodiments of the present application relate generally to electrical and electronic hardware, computer software, wired and wireless network communications, Bluetooth systems, RF systems, self-powered wireless devices, and consumer electronic (CE) devices. More specifically the present application relates to provision of networked based services to Bluetooth-enabled devices. The present application describes a very low-cost, multi-purpose, rapidly re-purposable Bluetooth node that may sit at the edge of a network and may be configured to allow a network system to dynamically add and remove different Bluetooth capabilities and allow for a much higher level of management of Bluetooth devices that are interacting with the network.

20 Claims, 4 Drawing Sheets

BLUETOOTH VIRTUALISATION

CROSS-REFERENCE TO RELATED APPLICATIONS

This application Claims Benefit of Priority under 35 U.S.C. §119(e) to U.S. Provisional Patent Application Ser. No. 61/798,329, filed on Mar. 15, 2013, and titled "Bluetooth Virtualization", which is hereby incorporated by reference in its entirety for all purposes.

FIELD

Embodiments of the present application relate generally to electrical and electronic hardware, computer software, wired and wireless network communications, Bluetooth systems, RF systems, self-powered wireless devices, and consumer electronic (CE) devices. More specifically the present application relates to provision of networked based services to Bluetooth-enabled devices.

BACKGROUND

Conventional Bluetooth devices are typically implemented as embedded systems, for each Bluetooth headset capability in a mobile device such as a cell phone, smart phone, or tablet, for example. There are some disadvantages to implementing embedded systems, such as: embedded system development can be slow and costly because embedded system design is difficult and is often bespoke, that is, customized to a particular system; end-points are more expensive as they require the capability to process a Bluetooth stack, and they require additional power to allow for processing the stack; it can be difficult to repurpose an already installed unit (e.g., adding new capabilities to an already installed unit) as this may require new hardware or at least new firmware loads, so that re-purposing time is at best typically minutes and often months; and there can be limited access to Bluetooth information (e.g., radio strengths) that could be very useful for optimizing systems.

Thus, there is a need for a very low-cost, multi-purpose, and rapidly re-purposable Bluetooth device.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of executable program instructions included on a non-transitory computer readable medium. Such as a non-transitory computer readable medium or a computer network where the program instructions are sent over optical, electronic, or wireless communication links and stored or otherwise fixed in a non-transitory computer readable medium. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

A Bluetooth (BT) baseband and host controller interface (HCI) controller are in communication with a BT peer device. As per the BT specification (e.g., Bluetooth SIG), such communications include the exchange of HCI messages between the BT HCI host controller and a BT host, on which typically run the BT profiles and application (e.g., a HandsFree profile and a HandsFree gateway application).

In the present application a BT host is configured to encapsulate and forward the HCI packets over a network (e.g., a TCP/IP network such as the Internet or VPN, a wireless network such as WiFi or WiMAX, or Ethernet connection with a network) to a compute engine, such as a server, PC, laptop, Tablet/Pad, one or more processors, or the like. The compute engine (server hereinafter) implements BT profiles and applications included in the encapsulated HCI packets. Further, the server forwards HCI packets (e.g. over a network or wireless network) from the profiles and applications on the server to a BT HCI controller and baseband.

Figure 1:
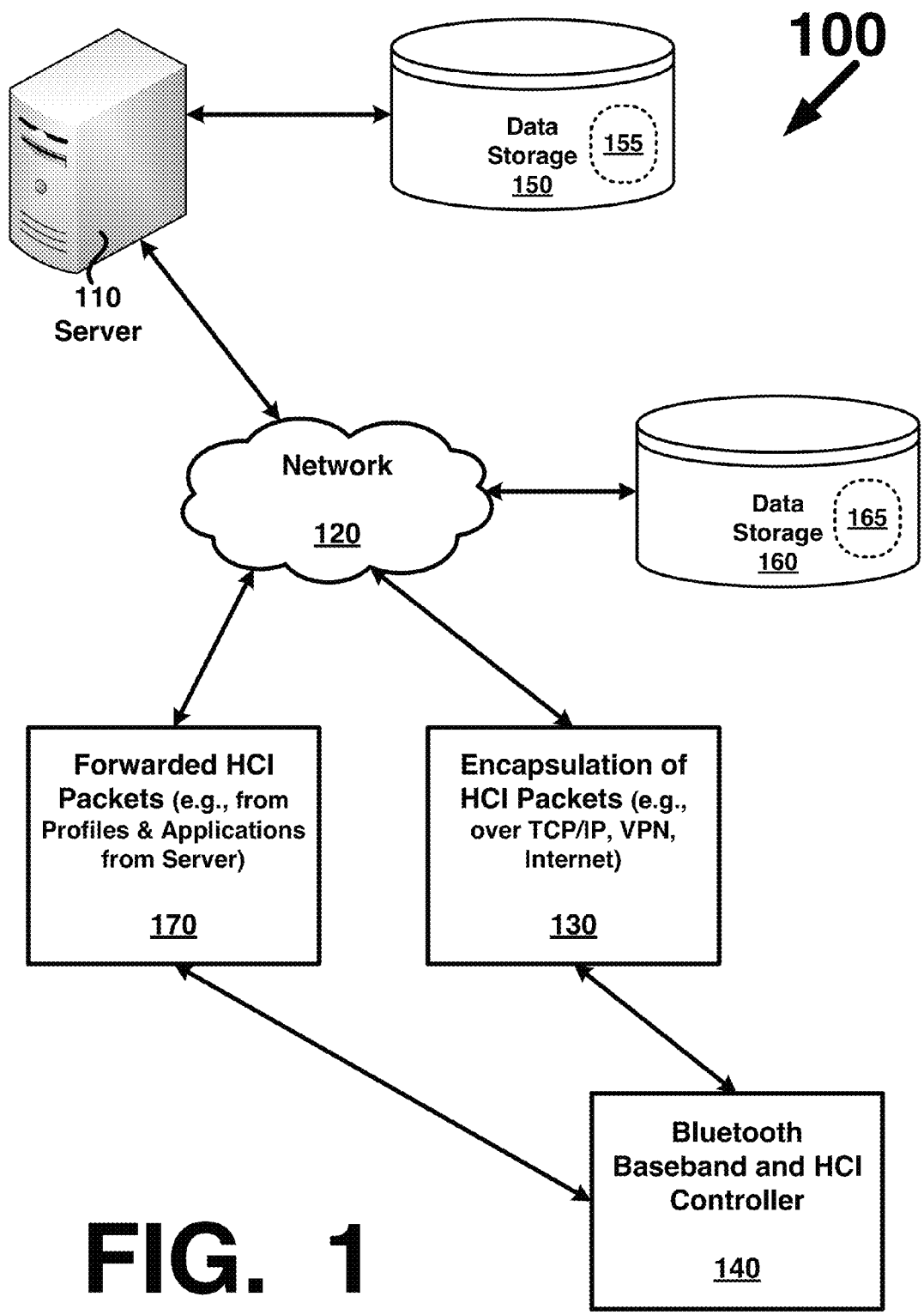
FIG. 1 depicts one example of a block diagram for Bluetooth host that encapsulates and forwards HCI packets over a network according to an embodiment of the present application.

FIG. 1 depicts one example of a block diagram 100 for BT host 140 that encapsulates and forwards HCI packets 130 over a network 120 to a server 110. Server 110 may be in communication with a data storage device 150. Network 120 may also be in communication with a data storage device 160. The data storage devices (150, 160) may include but are not limited to volatile and non-volatile memory, Flash Memory, hard disc drives (HDD), solid state drives (SSD), RAID, DRAM, and SRAM. HCI packets, forwarded HCI packets, encapsulated HCI packets, data in those packets, BT profiles, and BT applications may be stored on one or more data storage devices, such as 150 and/or 160, as denoted by 155 and 165, for example. Server 110 implements profiles and applications included in the encapsulated HCI packets 130 and is configured (e.g., via software) to forward the HCI packets 170 from those profiles and applications to BT baseband and HCI controller 140.

Figure 2:
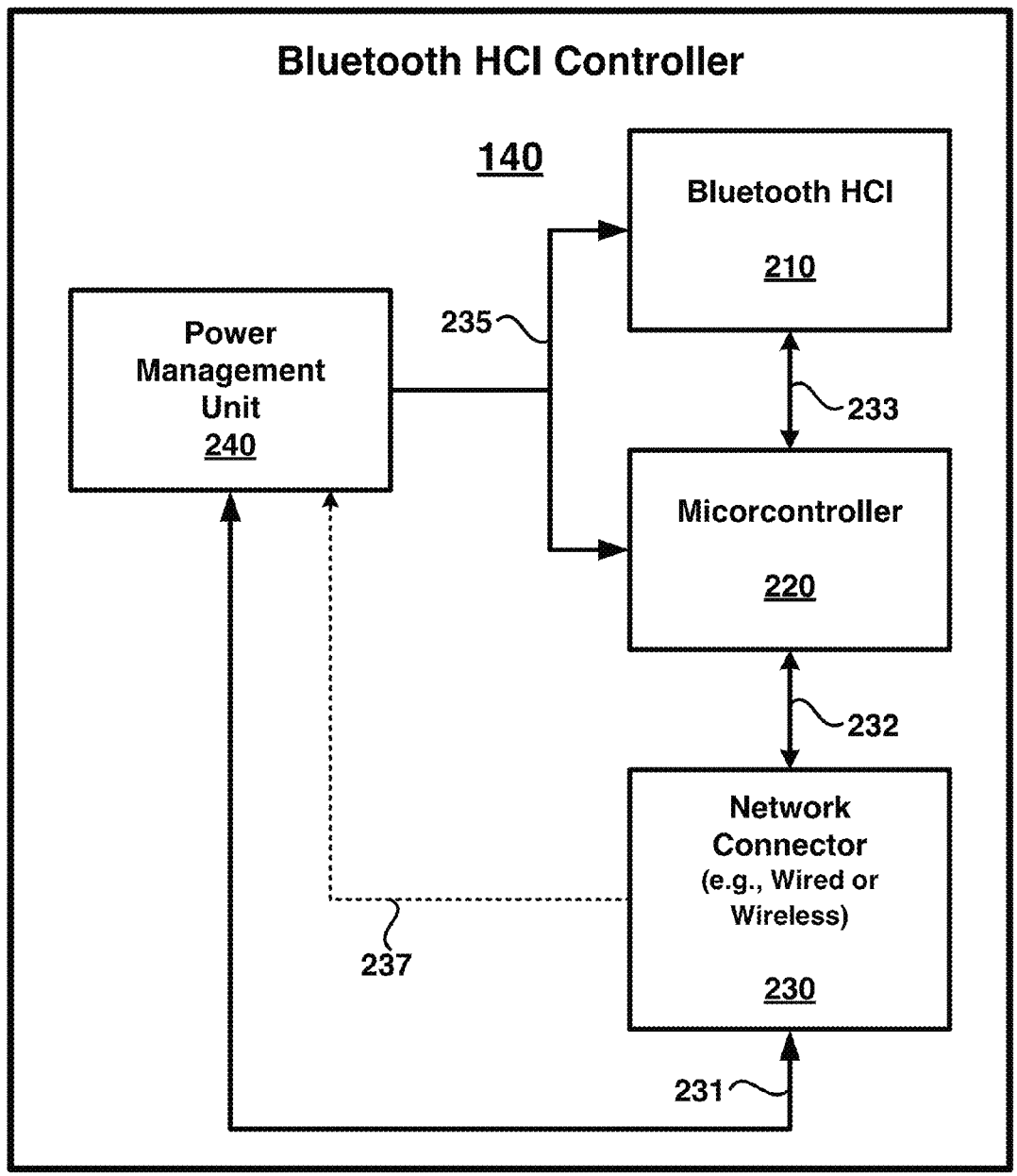
FIG. 2 depicts one example of a block diagram for a Bluetooth HCI controller according to an embodiment of the present application.

FIG. 2 depicts one example of a block diagram 200 for BT baseband and HCI controller 140. BT baseband and HCI controller 140 may include a BT HCI 210, a microcontroller 220, a network connector 230, and a power management unit 240. Network connector 230 may be wireless (e.g., BT or WiFi), wired (e.g., Ethernet), or both. If network connector 230 includes a wired connection (e.g., via a RJ45 connector or the like), then optionally the network connector 230 may supply electrical power 237 to the power management unit 240 (e.g., using power-over-Ethernet). Examples of a BT HCI controller 210 include but are not limited to a Bluecore 7-ROM solution from CSR connected 233 with the microcontroller 220. Examples of a microcontroller 220 include but are not limited an ARM M-3 Cortext such as the LPC1764 from NXP.

Figure 3:
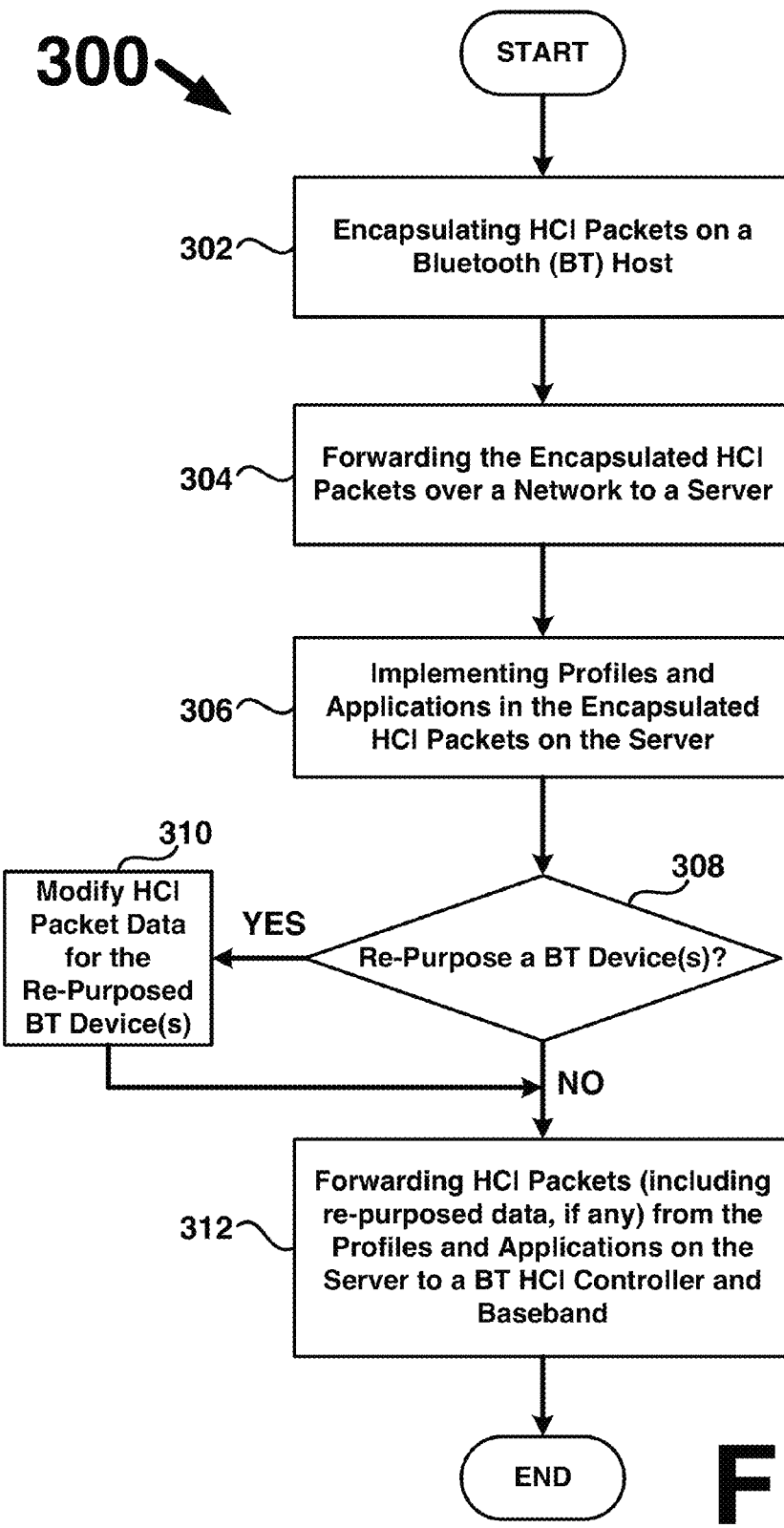
FIG. 3 depicts one example of a flow diagram for encapsulating and forwarding HCI packets over a network according to an embodiment of the present application.

FIG. 3 depicts one example of a flow diagram 300 for encapsulating and forwarding HCI packets over a network. At a stage 302 a BT host encapsulates HCI packets. At a stage 304, the BT host forwards the encapsulated HCI packets over a network to a server. At a stage 306, profiles and applications in the encapsulated HCI packets are implemented on the server. At a stage 308 a decision may be made to re-purpose one or more BT devices by implementing modified or entirely different data on those BT devices, such as modified or different profiles and applications. If a YES branch is taken, then at a stage 310 the HCI packet data for the re-purposed BT devices is modified and the flow 300 resumes at a stage 312. If a NO branch is taken, then the flow 300 continues at the stage 312 where the HCI packets from the profiles and applications on the server are forwarded to a BT HCI controller and baseband. At the stage 312, the same network used at the stage 304 may be used to forward the HCI packets from the server to the BT HCI controller and baseband.

Figure 4:
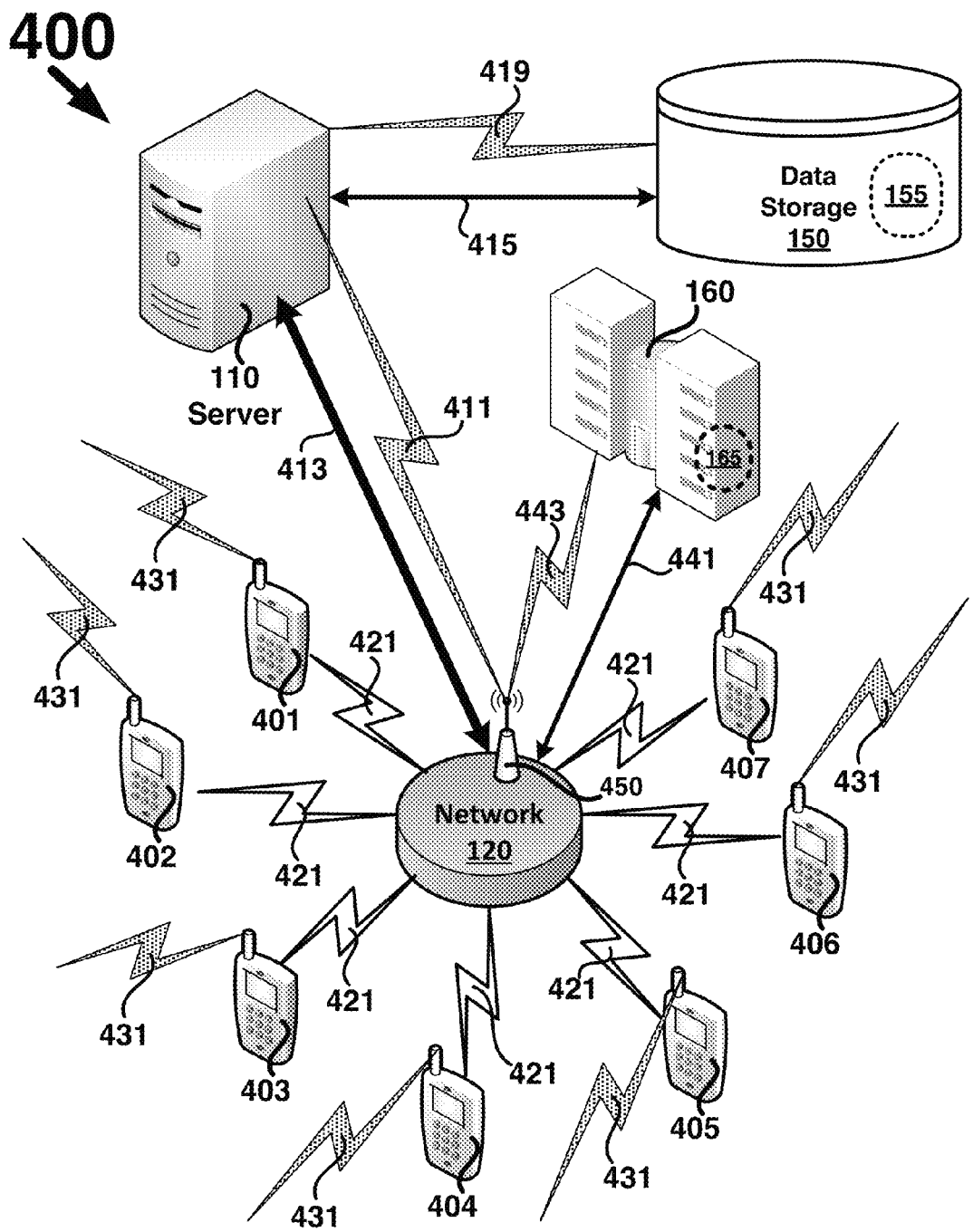
FIG. 4 depicts one example of Bluetooth virtualization according to an embodiment of the present application.

FIG. 4 depicts one example of Bluetooth virtualization 400. In FIG. 4 a plurality of BT devices denoted as 401-407 may be in wireless communications 421 with network 120 (e.g., via wireless router 450 or via their respective BT radios). There may be more or fewer BT devices than depicted in FIG. 4. The plurality of BT devices 401-407 may be in wireless communications 431 with one another via the network 120 and/or their respective BT radios. Network 120 may be in wireless 411 or wired 413 communications with server 110. As described above, server 110 may be connected with data storage device 150 via a wired 415 or wireless 417 connections. Network 120 may be connected with data storage device 160 (e.g., NAS) via a wired 441 or wireless 443 connections. The plurality of BT devices 401-407 may wirelessly interact with one another as BT peer devices. One or more of the BT devices may be configured as the BT host. One or more of the BT devices may be configured as the BT HCI controller and baseband. Any one of the BT devices may be re-purposed, for example as per the flow 300 of FIG. 3.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A method for providing network based services to Bluetooth-enabled devices, comprising:
    encapsulating host controller interface (HCI) packets on a Bluetooth (BT) host device;
    forwarding the encapsulated HCI packets over a network, to a compute engine in communication with the network;
    implementing from a non-transitory computer readable medium, profiles and applications contained in the encapsulated HCI packets on the compute engine; and
    forwarding HCI packets from the profiles and applications on the compute engine to a BT HCI controller and baseband processor.

2. The method of claim 1, wherein the BT HCI controller and baseband processor is included in a BT peer device that is in wireless communication with the network.

3. The method of claim 1 and further comprising:
    providing a plurality of BT peer devices, each BT peer device in wireless communication with the network and including the BT HCI controller and baseband processor, and each BT peer device including the same or different ones of the profiles and applications from the forwarding of the HCI packets.

4. The method of claim 3, wherein some or all of the plurality of BT peer devices are in wireless communication with one another.

5. The method of claim 3, wherein some or all of the plurality of BT peer devices are in wireless communication with one another using their respective BT radios.

6. The method of claim 3, wherein the BT peer devices that are in wireless communication with one another using their respective BT radios, using another type of wireless network or both.

7. The method of claim 3, wherein some or all of the plurality of BT peer devices are in wireless communication with one another, the network or both over a WiFi wireless network.

8. The method of claim 1, wherein the forwarding HCI packets comprises HCI packets having a plurality of different profiles and a plurality of different applications for a plurality of different BT peer devices, wherein each BT peer device includes the BT HCI controller and baseband processor.

9. The method of claim 1, wherein the compute engine is selected from the group consisting of a server, and a PC.

10. The method of claim 1, wherein the compute engine stores the encapsulated HCI packets on a data storage device that is in communication with the compute engine, the network, or both.

11. The method of claim 1, wherein the network includes a data storage device where a selected one or more of the encapsulated HCI packets, the HCI packets, the profiles, or the applications are stored.

12. The method of claim 11, wherein the data storage device comprises network attached storage (NAS).

13. The method of claim 1 and further comprising:
    re-purposing a BT device during the implementing.

14. The method of claim 13 and further comprising:
    forwarding HCI packets including re-purposed data created during the re-purposing for one or more re-purposed BT devices.

15. The method of claim 14, wherein the HCI packets with the re-purposed data are forwarded to a specified BT device.

16. The method of claim 15, wherein the specified BT device comprises the BT HCI controller and baseband processor.

17. The method of claim 15, wherein the specified BT device comprises the BT host device.

18. A method for providing network based services to Bluetooth-enabled devices, comprising:
    encapsulating host controller interface (HCI) packets on a Bluetooth (BT) host device;
    forwarding the encapsulated HCI packets over a wired network, wireless network, or both, to a compute engine in communication with the network;
    re-purposing from a non-transitory computer readable medium, one or more profiles and applications contained in the encapsulated HCI packets on the compute engine; and
    forwarding HCI packets including re-purposed profiles and applications from the re-purposing to a specified BT device in wireless communications with the network.

19. The method of claim 18, wherein the specified BT device comprises a BT HCI controller and baseband processor.

20. The method of claim 18 and further comprising:
a plurality of BT peer devices in wireless communications with each other and the network, and one or more of the plurality of BT peer devices wirelessly receives data in HCI packets that are forwarded during the forwarding.

\* \* \* \* \*